(12) United States Patent
Kincaid

(10) Patent No.: US 7,007,635 B2
(45) Date of Patent: Mar. 7, 2006

(54) CAT LITTER PODS

(76) Inventor: Virginia E. Kincaid, 4 Maplewood Dr., Muncie, IN (US) 47303

(*) Notice: Subject to any disclaimer, the term of this patent is extended or adjusted under 35 U.S.C. 154(b) by 100 days.

(21) Appl. No.: 10/843,603

(22) Filed: May 11, 2004

(65) Prior Publication Data

US 2005/0000461 A1    Jan. 6, 2005

Related U.S. Application Data

(60) Provisional application No. 60/477,227, filed on Jun. 10, 2003.

(51) Int. Cl.
*A01K 29/00* (2006.01)

(52) U.S. Cl. ............................ 119/169; 119/165
(58) Field of Classification Search ............ 119/161, 119/165, 169, 170, 171
See application file for complete search history.

(56) References Cited

U.S. PATENT DOCUMENTS

| | | |
|---|---|---|
| 3,284,273 A | 11/1966 | Prentice |
| 3,978,818 A | 9/1976 | Heldenbrand |
| 4,173,046 A | 11/1979 | Gallagher |
| 4,250,834 A | 2/1981 | Cheselka |
| 4,271,787 A | 6/1981 | Wellman |
| 4,534,315 A | 8/1985 | Sweeney |
| 4,756,273 A * | 7/1988 | Yananton ............... 119/169 |
| 4,774,907 A * | 10/1988 | Yananton ............... 119/169 |
| 4,813,374 A | 3/1989 | Sides |
| 4,869,204 A | 9/1989 | Yananton |
| 4,913,954 A * | 4/1990 | Mack ..................... 428/213 |
| 5,488,930 A | 2/1996 | Kasbo et al. |
| 5,630,376 A * | 5/1997 | Ochi et al. ............. 119/169 |
| 5,715,772 A * | 2/1998 | Kamrath et al. ........ 119/169 |
| 6,227,145 B1 * | 5/2001 | Miyamoto et al. ..... 119/172 |
| 6,244,216 B1 * | 6/2001 | Ochi ..................... 119/169 |

* cited by examiner

*Primary Examiner*—Teri Pham Luu
*Assistant Examiner*—Elizabeth Shaw
(74) *Attorney, Agent, or Firm*—Ritchison Law Offices PC; John D. Ritchison

(57) ABSTRACT

An apparatus for animal litter called a Cat Litter Pod. This apparatus features a bottom built-in liner, impervious to liquids; a top gauze-like, cheesecloth material to cover the litter granules; a way to join the top and bottom to provide an encasement space; and absorbent granules of various litter material inside the encasement. This litter pod provides convenience and portability to necessary sanitation devices for cats that are kept inside. Configured as a low profile and disposable this apparatus is particularly important to older or infirm cats that have problems with limited mobility.

16 Claims, 4 Drawing Sheets

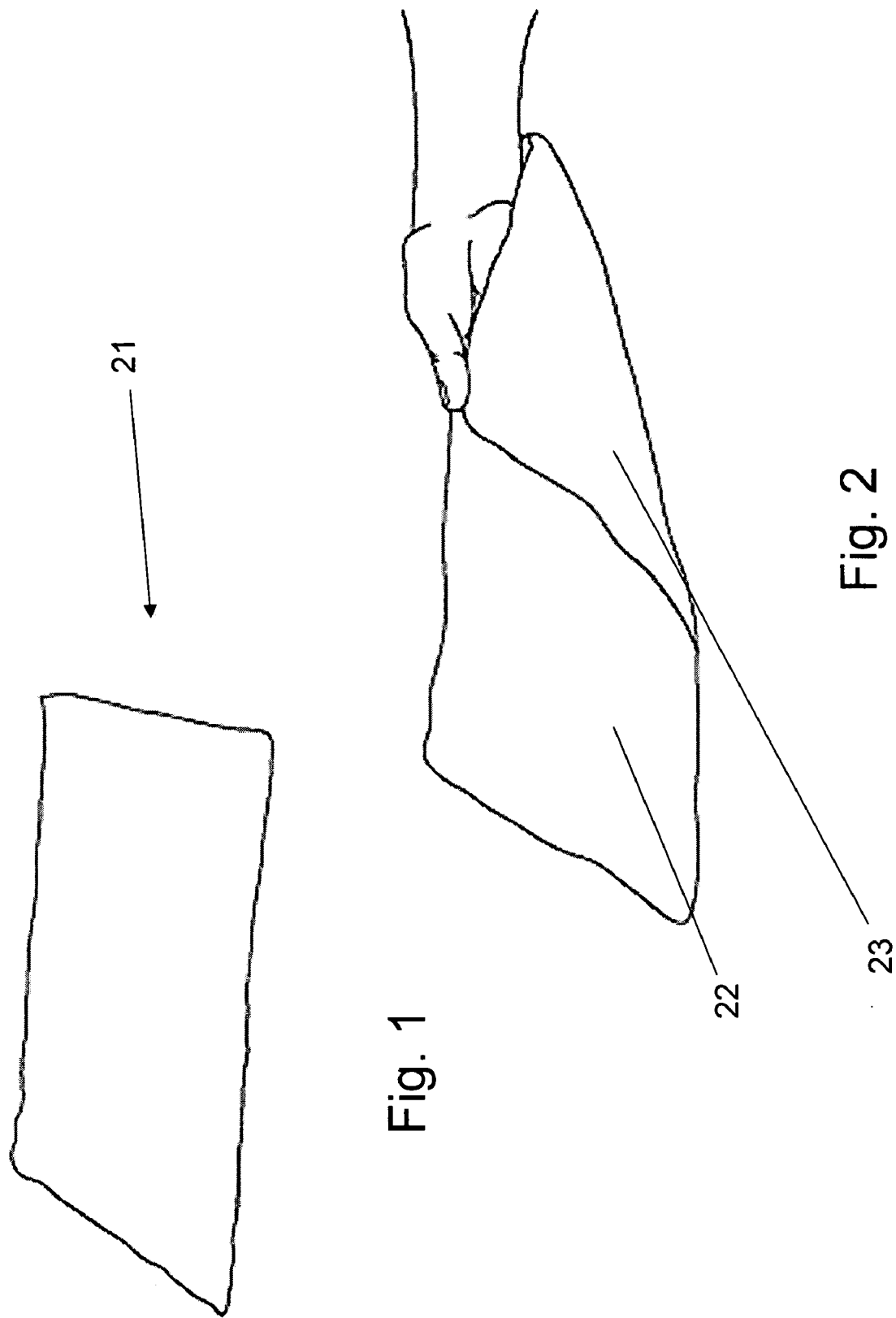

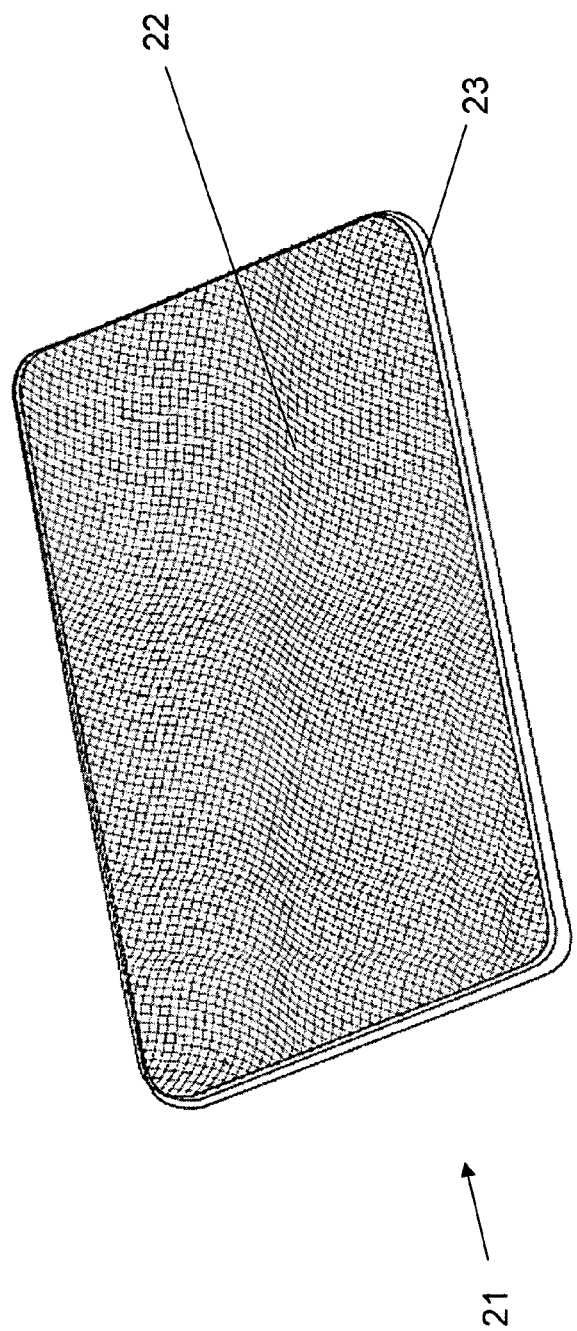
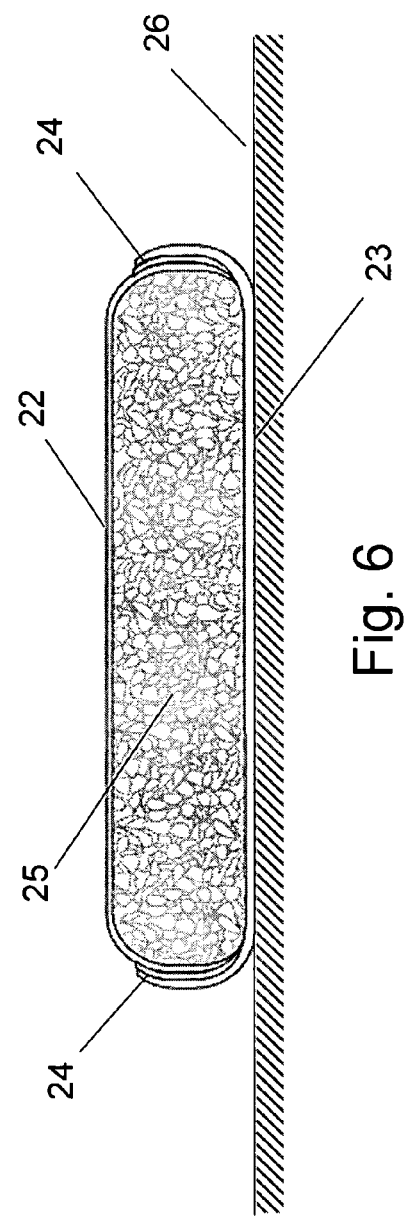
Fig. 5
Fig. 6

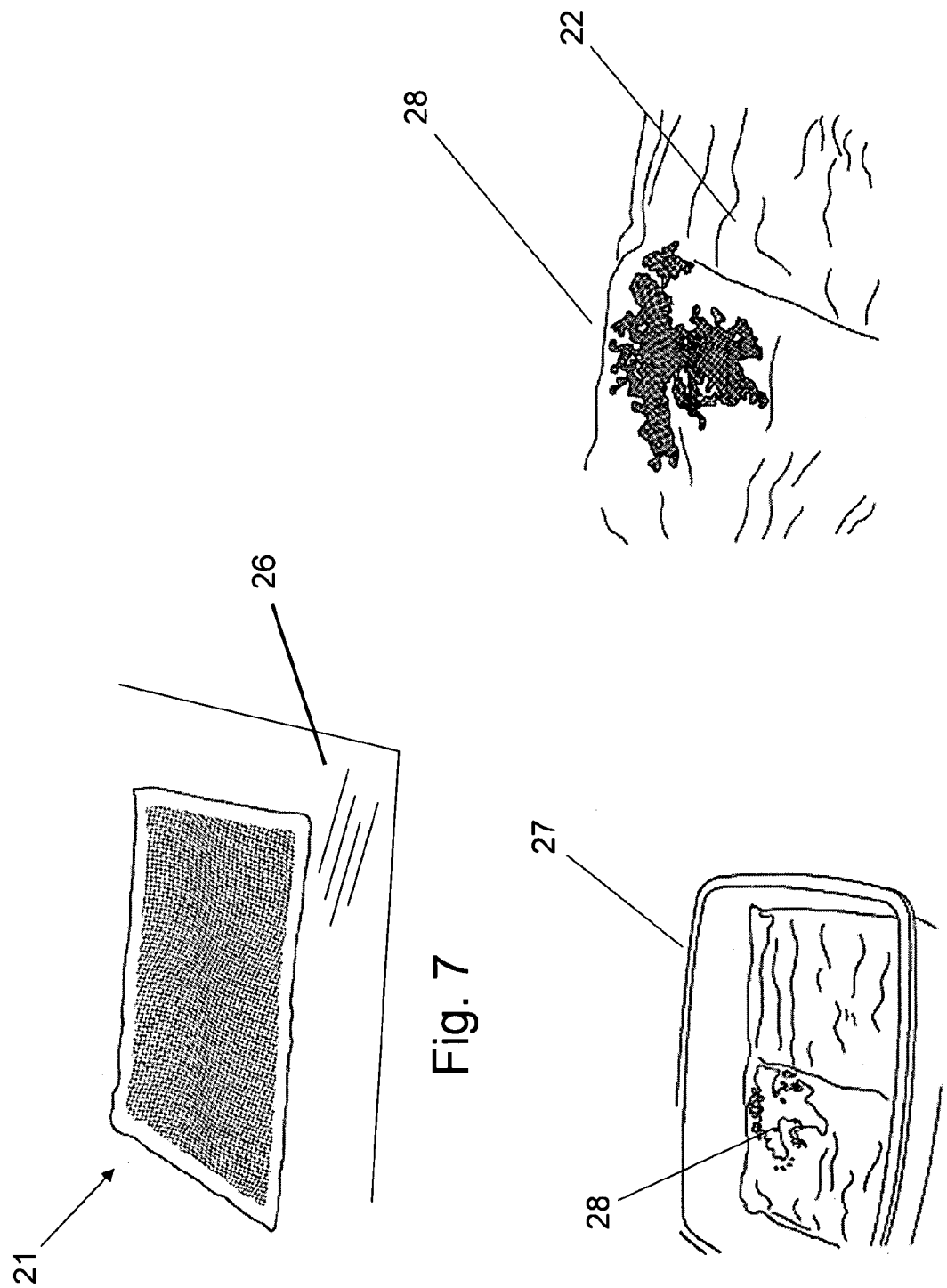

CAT LITTER PODS

CROSS-REFERENCE TO RELATED APPLICATIONS

This application claims the benefit of Provisional Patent Application Ser. No. 60/477,227 filed Jun. 10, 2003 by Virginia E. Kincaid and titled "CAT LITTER PODS".

FIELD OF INVENTION

The present Cat Litter Pod relates to the field of animal litter devices. Animal litter containers of the type containing loose particulate material therein, such as so-called "litter boxes" are well suited for household use by domestic pets, such as cats, to deposit their excreta therein.

FEDERALLY SPONSORED RESEARCH

Not Applicable.

SEQUENCE LISTING OR PROGRAM

Not Applicable

BACKGROUND—FIELD OF INVENTION

The new Cat Litter Pod described in this specification is an apparatus that is designed to easily and quickly provide access to a litter device for pets.

A. Introduction of the Problems Addressed

Cat litter devices have traditionally been focused on combinations of an impervious liner and an open tray of granules. These were used in concert with a permanent or disposable container. Disposability and convenience was often the purpose as is shown below in the teachings of the prior art. However, most litter devices leave an untidy clean-up for the pet owner.

Little has been accomplished to eliminate the cumbersome container or to provide a low profile litter device. This is particularly important to older or infirm cats that have problems with limited mobility. The instant apparatus presented here is cat litter "pod". The litter pod is configured and has features to permit a pet owner to have a low profile, disposable litter device that is convenient, clean and has several methods of utilization. Other prior art does not suggest or disclose the features of the Cat Litter Pod.

B. Prior Art

Animal litter devices have been featured in an increasingly frequent number of patents since the 1950's. Some devices have attempted to improve upon litter devices for parts of the problems as stated. In use, the prior art devices were often untidy and messy to use as well as limited in use. The new Cat Litter Pod addresses these limitations and provides a solution to the stated problems.

Examples of prior apparatus for liquid absorption begin with U.S. Pat. No. 3,284,273 issued to Prentice (1966). This teaches an absorbent pad for use as a floor covering to absorb dripped or spilled liquids, and generally provides spaced-apart upper and lower layers within which is contained a liquid-retaining material which may be a sheet material or a granular material such as grains of absorbent clay. At least the upper layer is made of a liquid-permeable material, such as felt, so that liquids impinging thereon will pass therethrough and be absorbed by the intermediate liquid-retaining layer. The patent discloses that the lower layer may be lined with a liquid barrier material.

The U.S. Pat. No. 3,978,818 issued to Heldenbrand (1986) discloses a litter container containing a body of litter within a container of waterproof material and enclosed by an outer wrapper which may be opened to expose the open-top, substantially rectangular container for use. The U.S. Pat. No. 4,173,046 issued to Gallagher (1979) discloses an absorptive and protective underpad for human patients utilizing a top cushioning layer which is perforated to admit liquids therethrough and a lower absorbent layer which will permit liquid flow into the absorbent layer and reduce to a minimum the generation and release of offensive odors from the absorbent layer.

One difficulty with many of the prior art animal litter devices, which utilize particulate litter material, is that the deposit of waste material tends to cause the litter to become foul-smelling and prompts the replacement of the entire box of litter after only limited use. To overcome this problem, in lieu of particulate litter material, U.S. Pat. No. 4,250,834 issued to Cheselka (1981) teaches layers of absorbent fabric-like material which may be individually removed to expose fresh layers beneath.

Another litter device patent is U.S. Pat. No. 4,271,787 issued to Wellman (1981). It discloses a plurality of self-contained, disposable feline litter boxes housed in stacked relation within a container. Each litter box includes a removable top cover to expose the litter material contained within respective boxes. As each litter box is soiled, it may be removed from the container and disposed of, thereby exposing the next one for use.

Many of these devices usually provide a hard, perforated platform on which the animal stands. Not only do such devices fail to adequately accommodate solid waste, but domestic animals such as cats are disinclined to use such litter boxes as they instinctively desire to cover up their waste and therefore favor litter boxes containing particulate material which they can paw to cover the deposited waste.

Other prior art litter box solutions propose various assemblies of parts including, Sweeney, U.S. Pat. No. 4,534,315 (1985) which discloses an assembly wherein nonabsorbent granules are layered over an absorbent layer. A combination liner bag and litter assembly is taught in U.S. Pat. No. 4,813,374 issued to Sides (1989). It provides for opening the bag and exposing the granules to the felines.

Another patent, issued Yananton, U.S. Pat. No. 4,869,204 (1989) discloses a three part assembly consisting of a screen to prevent tearing, an absorbent pad, and an impermeable plastic lining all of which is covered by a layer of granular litter. An animal litter package is taught by U.S. Pat. No. 5,488,930 issued to Kasbo (1996) which shows a non-woven web film over granules that is broken open to expose the granules.

While many additional patents could be cited regarding other variations of assemblies, none of these prior art solutions address the problems of either the portability or the scattering of pellitized litter and/or have not been commercially successful because they are too complex and costly, and require the maintenance and cleaning of the various component parts. None of the prior art teaches all the features and capabilities of the Cat Litter Pod.

SUMMARY OF THE INVENTION

This apparatus is a cat litter pod with various components and features to enhance its use. The components include a bottom built-in liner, impervious to liquids; a top gauze or cheesecloth-like material to cover the litter granules; a way to join the top and bottom to provide an encasement space;

and granules of litter material inside the encasement. The material comprising the top surface of the device is porous to allow liquids to flow into the litter granules, yet of the nature (such as "cheese cloth", or the like) to prevent the litter granules from escaping the encasement space. This cat litter device, when embodied in the configuration of the present apparatus, provides a way to absorb liquid, contain the granules, and provide several other advantages over prior art as described below.

Objects and Advantages

Accordingly, there are several objects and advantages of the Cat Litter Pod. One advantage of this device over others in the field is that it prevents build-up of litter on sick or immobile cats. Unlike other portable devices, this cat litter pod with its top porous cover prevents the litter material from attaching or adhering to the pet's fur after it has lain in the box because of its sickness or immobility.

Further important advantages are related to the covered granules. The containment provides a pod device that is clean and sanitary. There is little or no tracking of litter and less dust than many of the conventional litter designs. In addition, since the granules are encased and contained, the pet does not "eat" or ingest the litter. Finally, the covered granules in effect discourage an infant or toddler from potential sandbox play that many cat owners have experienced around small children.

In addition to the relative cleanness, the encased device has the advantage of being used in conjunction with a litter box or pan, or just laid on a flat surface by itself.

Another advantage is the simple and inexpensive design of the cat litter pod. It can be made of various common materials that will be discussed below.

Still another advantage is the versatility of the cat litter pod. Cats can be very particular to the type of litter that the pet accepts. The smell and the consistency of one specific litter are not universally accepted by all cats. This device can be utilized with various common litter granule materials already on the market today or made available as new granule materials or the like are developed.

Another important feature is its size. The cat litter pod can be very thin in depth and have various top and bottom areas. Its size can be small enough for portability and convenience for travel or use with one pet. The pod can be large enough for use with multiple cats.

A further advantage is found in its disposability. The device can be used only once or used multiple times. Then, the inexpensive, contained granule device may be easily discarded without the normal "mess" associated with loose granules or broken litter liners.

Finally, other advantages and additional features of the present apparatus will be more apparent from the accompanying drawings and from the full description of the cat litter pods. For one skilled in the art of cat litter devices it is readily understood that the features shown in the examples with this apparatus are readily adapted to other types of pet litter devices

DESCRIPTION OF THE DRAWINGS—FIGURES

The accompanying drawings, which are incorporated in and constitute a part of this specification, illustrate an embodiment of the cat litter pod that is preferred. The drawings together with the summary description given above and a detailed description given below serve to explain the principles of the apparatus. It is understood, however, that the cat litter pod is not limited to only the precise arrangements and instrumentalities shown.

FIG. 1 is a PICTURE of an Actual Prototype Cat Litter Pod.

FIG. 2 is a PICTURE of an Actual Prototype Cat Litter Pod demonstrating the two different sides.

FIG. 5 is a PERSPECTIVE VIEW of the Cat Litter Pod showing its various parts that make up an embodiment of the apparatus.

FIG. 6 is an enlarged SECTION of the Cat Litter Pod showing the two sides, their attachment and the cat litter captured in between the two sides.

FIG. 7 is a PICTURE of an Actual Prototype Cat Litter Pod demonstrating the use of the device without a container.

FIG. 8 is a PICTURE of an Actual Prototype Cat Litter Pod demonstrating the use of the device with a container or litter box.

FIG. 9 is an enlarged area showing the containment of the cat urine and other egested materials by the cat litter pod.

DESCRIPTION OF THE DRAWINGS—REFERENCE NUMERALS

Figures 3, 4:
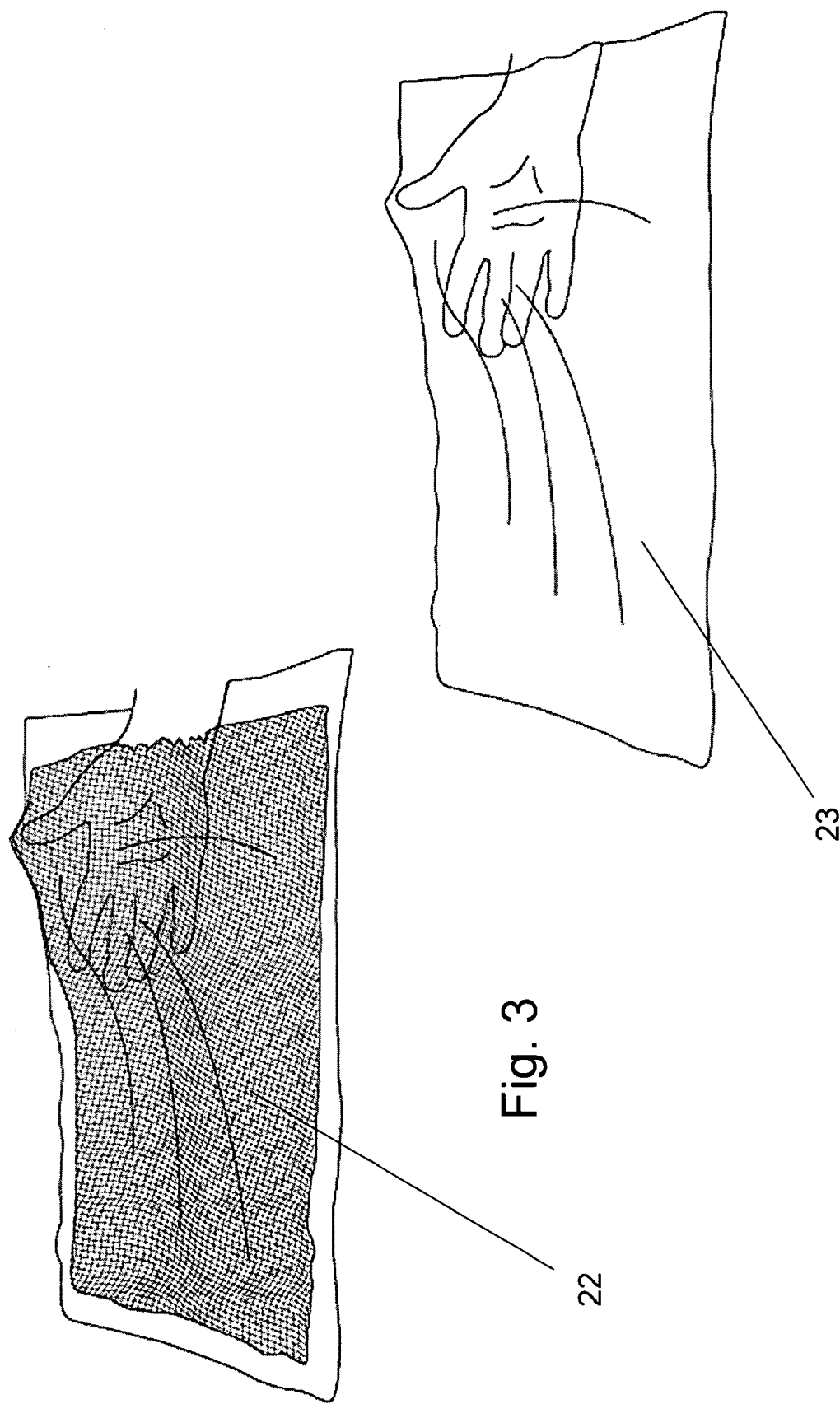
FIG. 3 is a PICTURE of an Actual Prototype Cat Litter Pod demonstrating the top surface that is porous to liquids.
FIG. 4 is a PICTURE of an Actual Prototype Cat Litter Pod demonstrating the impervious to liquids side.

The following list refers to the drawings:
21 cat litter pod
22 top surface
23 bottom liner
24 way to connect top and bottom
25 granules
26 flat surface
27 container
28 darkened area of granules

DETAILED DESCRIPTION OF PERFERRED EMBODIMENT

The new apparatus is a cat litter "pod". The litter pod is comprised of a bottom built-in liner, impervious to liquids; a top gauze or cheesecloth-like material to cover the litter granules; a way to join the top and bottom to provide an encasement space; and absorbent granules of various litter material inside the encasement. A person having ordinary skill in the field of this type of apparatus appreciates the various materials and component parts that may be used to physically permit this cat litter pod to be produced and utilized. The improvements over the existing art are providing a device that:

prevents the build-up of litter on sick or immobile cats;
is clean and sanitary;
may be used alone or with a container;
is a simple and inexpensive design;
is versatile in the type of absorbent granules used;
is thin and can be of various sized areas; and
is disposable.

There is shown in FIGS. 1–9 a complete operative embodiment of the cat litter pod. The apparatus generally relates to a litter device for cats. While the present cat litter pod shows an apparatus that is approximately sixteen to eighteen inches in length, twelve inches in width and less than one inch in depth as the embodiment for a cat litter pod, this showing is not meant to limit the intention of the present device. The same concept applies to other litter pod devices of varying lengths, widths and depths.

The preferred embodiment of the device is comprised of a few parts as shown in FIG. 1-9 of the drawings. These parts include, but are not limited to, a bottom built-in liner 23, impervious to liquids; a top material 22 to cover the litter granules; a way 24 to join the top and bottom to provide an encasement space; and absorbent granules 25 of various litter material inside the encasement.

FIG. 1 is a PICTURE of an Actual Prototype Cat Litter Pod 21.

This view delineates the cat litter pod 21 placed on top of a hard, flat surface such as the top of a cabinet or a floor.

FIG. 2 is a PICTURE of an Actual Prototype Cat Litter Pod 21 demonstrating the two different sides. It shows the two main surfaces of the device. The top surface 22 and the bottom liner 23 will be described below.

FIG. 3 is a PICTURE of an Actual Prototype Cat Litter Pod 21 demonstrating the top surface 22. The Top surface 22 is a gauze or cheesecloth-like material used to cover the litter granules 25 (not shown in this FIG.). The embodiment shown is a cheese cloth with a weave that has been empirically derived to suit the specific granule material 25. One skilled in the art appreciates that for varying sized granules 25, the actual weave of the top material 22 may vary. However, as the granule 25 size varies, it is a relatively simple empirical process to select the weave "tightness or looseness" for the top material 22 that contains the specific granule type 25 utilized. While the embodiment shows an interwoven cloth fabric, one skilled in the art appreciates that there are other materials in existence, or that may be developed in the future. These other materials may well suit the design of the top cover 22 if they are absorbent, porous, and permeable, yet suitable in the size of the weave or configuration in order to encase the granules 25. Therefore, it is understood that the embodiment shown is exemplary and not limiting the intention of the present design in respect to the actual material specification of the top cover 22.

FIG. 4 is a PICTURE of an Actual Prototype Cat Litter Pod 21 demonstrating the bottom liner 23. The bottom liner 23 of the present embodiment is a plastic sheet material that is impervious to liquid. This material serves to contain the granules 25 (not shown in this FIG.) from the bottom side of the device. The material prevents any liquid material such as cat urine water or the like from escaping onto the supporting flat surface 26 below One skilled in the art appreciates that the thickness of the material may vary. The present embodiment shows an approximately eight tenths mil (0.8 mil) thickness of polyethylene sheet plastic. This is an example and not limitation to the intention of the present design. Further, one skilled in the art appreciates that alternative embodiments are possible with other impervious materials such as waxed or impregnated paper, a plethora of other plastic materials (such as polypropylene, poly carbonates, other thermoplastic resins—with and without fiber fillings) and various composite compounds currently available or developed in the future, or the like. These various alternatives must demonstrate the characteristics of being impervious to liquids, relatively inexpensive, and able to be produced in a sheet-like configuration.

FIG. 5 is a PERSPECTIVE VIEW of the Cat Litter Pod 21. This view shows the bottom liner 23 "wrapping" itself outside of the top surface 22. Therefore any liquid, such as the cat urine, that is being placed in and through the top surface 22 will be contained from leakage or escape until the granules have had a chance to trap and absorb the liquid.

FIG. 6 is an Enlarged SECTION of the Cat Litter Pod 21. This view shows components and the way they are sealed to form an encasement. The top surface 22 forms the top section of cat litter pod 21. The bottom liner 23 forms the bottom section of the cat litter pod 21. The bottom liner 23 overlaps the top surface 22 and is on the exterior side. Sandwiched between the top surface 22 and bottom liner 3 at the point of overlap is a way to seal 24 the two sections together into the encasement device. This way 24 may be of various configurations. The preferred embodiment shown is a double sided adhesive tape. Alternative embodiments include various adhesives and glues, heat sealing the two surfaces, and the like. The preferred embodiment and the alternatives mentioned here are stated as examples and not limitations to the manner in which the top surface 22 is sealed and attached to the bottom liner 23.

Once three (3) of the sides of the cat litter device are sealed, the various cat litter granules 25 may be placed inside the encasement. Then, the final fourth (4th) side may be sealed and the cat litter pod 21 is complete.

FIG. 7 is a PICTURE of an Actual Prototype Cat Litter Pod 21 demonstrating the use of the device without a container. Here the device is laid directly onto a flat surface 26 such as a table top, counter top, or floor.

FIG. 8 is a PICTURE of an Actual Prototype Cat Litter Pod 21 demonstrating the use of the device with a container or litter box. The container 27 may be any one of the plethora of cat litter containers, often called litter boxes, which are commercially available. FIG. 8 shows an area 28 where a cat has deposited its urine.

FIG. 9 is an Enlarged Area showing the containment of the cat urine and other egested materials by the cat litter pod 21. The darken area 28 is where the urine has penetrated through the top surface 22 and has been absorbed by the granules 25. This drawing demonstrates a key characteristic of the device—the top surface 22 permits the urine or other liquid to permeate through to the granules while continuing to encase and contain the granules.

In total, all the points and details mentioned here throughout this detailed description of the drawings are exemplary and not limiting. Other components specific to describing a cat litter pod 21 may be added as a person, having ordinary skill in the field of this type of litter apparatus, well appreciates. The drawing and components have been focused on the parts shown in respect to the present cat litter pod 21.

Operation of the Preferred Embodiment

The new cat litter pod 21 has been described in the above embodiment. The manner of how the apparatus operates is described below. Note well that the description above and the operation described here must be taken together to fully illustrate the concept of the cat litter pod 21.

The embodiment described above is a cat litter pod 21 which includes a bottom built-in liner 23, impervious to liquids; a top gauze or cheesecloth-like material 22 to cover the litter granules 25; a way 24 to join the top and bottom to provide an encasement space; and absorbent granules 25 of various litter material inside the encasement. These components and material are configured to provide the apparatus as a whole known as the cat litter pod 21.

The embodiment of the cat litter pod 21 may be used by a person in several manners to aid in the sanitation of a cat that is kept inside. As stated above, the cat litter pods 21 may be used alone or by themselves on a flat surface 26 such as a table top, counter top, or floor. Please see FIGS. 1, 2, and 7. In addition, the cat litter pod 21 may be used in conjunction with a commercially available litter box or container. Please see FIG. 8.

Because the granules 25 are contained by the bottom liner 23 and the top surface 22, the cat litter pod 21 provides a unique feature for immobile or sick/infirm cats that lie on top of the litter for long periods of their rehabilitation. That feature is that the granules 25 are contained and therefore do not stick or "mat" to the fur of the languishing cat.

Two other points merit discussion in the operation of the embodiment of the cat litter pod 21. First, the well known trait of some cats is to dig and/or bury any of their urine or other excrement such as cat feces. The ability of the top surface 22 to permit some tactility of the paws and the litter without releasing the granules from the encasement have been demonstrated with the prototype devices. Note however that languishing or infirm cats are much less likely to be concerned with the "covering trait" of healthier cats.

Second, the use of the cheesecloth or the like as a top surface 22 has some impact on containing the feces. Again, testing of the prototype is encouraging. The liquidity of the feces of a "sickly" cat is contained much like the urine. The presence of firm fecal material is simply discarded from the top surface 22 after the cat exits the cat litter pod 21 if the pod is to be re-used. Likewise the fecal matter is encased in the device as the whole cat litter pod 21 is folded and deposited into a trash container if and when the pod 21 is ready to be discarded.

The cat litter pod has been described above in connection with what is presently considered to be the most practical and preferred embodiment. With this description it is to be understood that the apparatus is not to be limited to the disclosed embodiment On the contrary, the cat litter pod is intended to cover various modifications and equivalent arrangements included within the spirit and scope of the description.

What is claimed as new and desired to be protected by Letters Patent is:

1. An animal litter apparatus, comprising:
   (a) a bottom layer of material impervious to liquids such as water and cat urine;
   (b) a top layer of interwoven, liquid-permeable material contiguous to the bottom layer along the entire perimeter of the top layer; and,
   (c) a means to securely attach the bottom layer to the top layer along the contiguous perimeters of the top layer and the bottom layer
   whereby an encasement is formed suitable for holding various amounts of absorbent material.

2. The apparatus according to claim 1 wherein the interweave of the top layer is configured in a way to contain cat litter granules.

3. The apparatus according to claim 2 wherein the top layer material is a cheesecloth.

4. The apparatus according to claim 2 wherein the top layer material is a nylon mesh-like material.

5. The apparatus according to claim 1 wherein the bottom layer material is a composite material.

6. The apparatus according to claim 1 wherein the bottom layer material is a type plastic.

7. The apparatus according to claim 1 wherein the bottom layer material is a polyethylene.

8. The apparatus according to claim 7 wherein the polyethylene material is approximately eight tenths mil in thickness.

9. The apparatus according to claim 1 wherein the bottom layer material is a polypropylene.

10. The apparatus according to claim 1 wherein the bottom layer material is a polycarbonate.

11. The apparatus according to claim 1 wherein the bottom layer material with a thermoplastic resin.

12. The apparatus according to claim 1 wherein the means to attach is an adhesive.

13. The apparatus according to claim 1 wherein the means to attach is by way of a heat sealing process.

14. The apparatus according to claim 1 wherein the means to attach is a double-sided connection tape.

15. A pet litter apparatus, comprising:
   (a) a bottom surface of a liquid-impervious material;
   (b) a top interwoven surface of a liquid-permeable material;
   (c) a means to join the bottom surface and the top surface contiguously along the respective perimeters of each surface,
   (d) forming an encasement holding various amounts of absorbent litter material.

16. A pet litter apparatus, comprising:
   (a) a bottom surface of an eight tenths mil thick polyethylene sheet of plastic film;
   (b) a top tightly interwoven surface of a cheese cloth material such that said weave contains common cat litter granules;
   (c) a double-sided cellophane adhesive tape to join the bottom surface and the top surface contiguously along the respective perimeters of each surface,
   (d) forming an encasement holding various amounts of absorbent litter material.

* * * * *